TRANSISTORIZED SWITCHING CIRCUIT HAVING HIGH INPUT IMPEDANCE

Filed May 11, 1964

INVENTOR.
PHILIP I. WAJS
BY [signature]
ATTORNEY

TRANSISTORIZED SWITCHING CIRCUIT HAVING HIGH INPUT IMPEDANCE

Filed May 11, 1964 3 Sheets-Sheet 2

INVENTOR.
PHILIP I. WAJS
BY John F. Lehrs
ATTORNEY

Aug. 15, 1967 P. I. WAJS 3,336,511

TRANSISTORIZED SWITCHING CIRCUIT HAVING HIGH INPUT IMPEDANCE

Filed May 11, 1964 3 Sheets-Sheet 3

INVENTOR.
PHILIP I. WAJS

BY John F. Lohan
ATTORNEY 3,336,511

TRANSISTORIZED SWITCHING CIRCUIT HAVING HIGH INPUT IMPEDANCE

Philip I. Wajs, Euclid, Ohio, assignor to Bailey Meter Company, a corporation of Delaware Filed May 11, 1964, Ser. No. 366,281
12 Claims. (Cl. 317—148.5)

This invention relates to a high impedance switch. More particularly this invention relates to a transistorized switch having a high input impedance in either the on or off position.

A particularly troublesome problem with many electronic switching circuits is low input impedance when in an energized condition. These circuits have a high input impedance when de-energized, but a low impedance when switched on. When circuits of this design are used, say in a high-low alarm monitor, the manufacturer often lists two input impedance levels in his specification, one for the "on" and one for the "off" condition. Needless to say a low impedance specification is very undesirable, especially when it causes loading of the transmitting device.

Circuits are available for switching purposes which present a high input impedance in either the on or off position. These circuits are complicated and require costly arrangements of an excessive number of components. True a high input impedance has been attained, but only by a very costly and troublesome solution.

Until now, the circuit designer had to be content with either a low impedance electronic switch or a very costly one. Now, however, the circuit I have invented makes available to the designer a switch which is extremely simple and inexpensive with a high input impedance in either of its stable states.

It is therefore an object of my invention to provide a transistorized switching circuit having a high input impedance.

Another object of my invention is to provide a simplified null detector circuit.

A further object of my invention is to provide a high-low alarm monitor having a high input impedance in either the alarm or non-alarm condition.

Still another object of my invention is to provide a high impedance three-position controller.

Other objects and advantages will be apparent from the following description. The novel features will be particularly pointed out in the appended claims.

Referring to the drawings.

Figure 1:
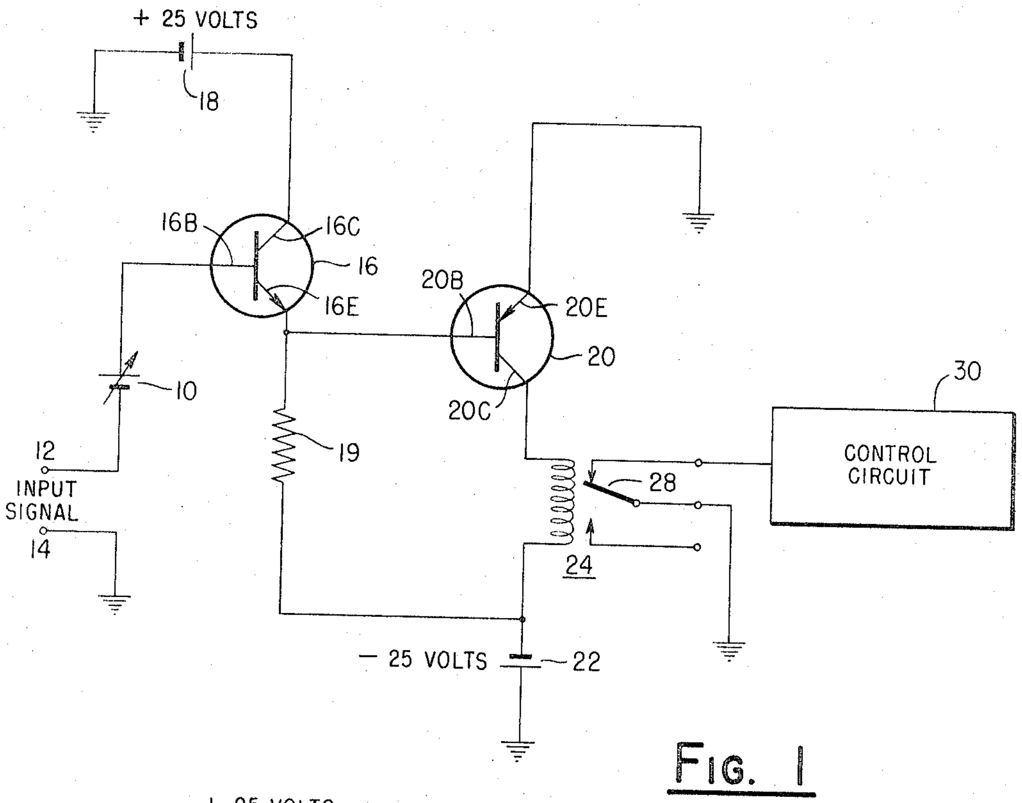
FIG. 1 is a simplified schematic of a high impedance transistorized switch.

Referring to FIG. 1, I show a variable direct current supply 10 for adjusting the level of input signal required to switch my circuit from one stable state to the other. The switching signal is connected to two input terminals 12 and 14 in series with said variable direct current supply. The source of said switching signal will vary widely depending upon the use to which my switch is put. For example, my circuit could be arranged to disconnect a pump used to maintain tank level. In this example, a level detector would generate the switching signal connected to the input terminals 12 and 14. The output of this detector could be designed to range from 0 to −10 volts, for example, with each volt representing a different tank level. If the variable direct current supply 10 was set at +8 volts the pump would be disconnected when the tank reached 80% of capacity. This operation will become clear as my description proceeds. It should be understood this is only one example of many applications for my unique switching circuit.

The base electrode 16B, of a first switching transistor 16, is connected to the source 10 and has impressed upon it a voltage which is the sum of the variable direct current supply and the signal connected to the input terminals 12 and 14. Voltage is supplied to the collector electrode 16C of the transistor 16 from a +25 volt supply, here indicated as a battery 18. Connected to the emitter electrode 16E is a load resistor 19 and the base electrode 20B of a transistor 20. A −25 volt supply, here indicated by a battery 22, biases the transistor 16 through load resistor 19. The emitter electrode 20E of the transistor 20 is, as indicated, connected to ground. Connected to the collector electrode 20C is a load relay 24. The same −25 volt supply which biases the transistor 16 also biases transistor 20 through the relay 24. As indicated by the identifying arrows on the emitter electrodes 16E and 20E, I employ complimentary transistors in my circuit. That is, one transistor has NPN junctions and the other PNP.

Operation of my switching circuit is as follows. The variable direct current supply 10 is adjusted, as explained previously, to the desired switching level. Preferably, but not necessarily, the variable supply has a range equal to that of the input signal with reverse polarity. Using a 0 to −10 volt input signal means the variable supply should vary from 0 to +10 volts. Any setting of the variable supply having an absolute value less than the input signal will forward bias the emitter-base junction of transistor 16 since its emitter electrode 16E is supplied from a −25 volt source. With transistor 16 connected in an emitter follower configuration and biased conducting the base drive of transistor 20 will nearly equal the base drive of the first transistor. As explained, the base drive of the first switching transistor 16 equals the sum of the variable direct current supply and the input signal. Whenever the sum of these two voltages is greater than zero, the transistor 20 will be biased non-conducting since its emitter electrode 20E is at ground potential.

Assume a setting for the variable direct current supply 10 of +8 volts and an input signal of −7 volts. The base drive voltage of the transistor 16 will be +1 volt and that of the second nearly +1 volt because of the emitter-follower configuration. The transistor 20 having PNP junctions will be back biased and non-conducting since its emitter electrode is connected to ground. Now as the input signal goes more negative than the supply voltage is positive, a small negative signal develops at the base electrode 20B of the transistor 20 causing it to become forward biased and begin to conduct. As the input signal continues to go negative the transistor 20 conducts more and more until it is operating in its saturated region. The emitter electrode 16E of the transistor 16 drops to about −½ volt below ground as controlled by conduction of the transistor 20. As the input signal continues to go negative it eventually exceeds the supply signal by more than ½ volt and the transistor 16 will be back-biased and cut off. In other words, whenever the input signal is less than the variable supply setting the transistor 20 is non-conducting, and whenever the switching signal is greater than the variable supply signal the transistor 20 is conducting. Conduction of the first and second transistors has reversed and the circuit has switched from one stable state to the other.

When transistor 20 is conducting current flows through the load relay 24 thereby causing said relay to be energized and opening a pair of normally closed relay contacts 28. Opening the control contact 28 de-energizes a control circuit 30, here merely indicated as a block. In my example, where fluid level is being controlled, the control circuit 30 would include a motor controller for disconnecting the pump.

Again, I would like to emphasize one of the most important advantages of my circuit is its high input impedance at all times. The input impedance does not depend on the operation of the transistors, but remains relatively high at all times. I characterize the various impedance levels as case 1, the on-impedance, case 2, the switching impedance and case 3, the off-impedance. As a general approximation the input impedance of an emitter-follower circuit is given by:

$$R_{IN}=\frac{\beta R_L r_C}{r_C+\beta R_L}$$

where $r_C$ is the collector-to-base junction resistance.
$\beta$ is the transistor current gain, and
$R_L$ is the load or emitter circuit resistance.

If $$r_C>>\beta R_L$$

then $$R_{IN}\approx\beta R_L$$

For case 1, the load resistance $R_L$ essentially equals the load resistor 19 and the input impedance equals $\beta$ times the load resistor 19. In case 2, transistor 20 is switching on and the load resistance $R_L$ is predominantly the base circuit resistance of the transistor 20. Although this may result in the dynamic input impedance being relatively low during the switching cycle the static input impedance remains high as switching time is very short. The emitter voltage of transistor 16 now equals approximately ground potential as the transistor 16 is reversed biased and cut-off thereby presenting an open circuit for case 3 and the input impedance is essentially infinity. The transistor 20 remains on being forward biased through the load resistor 19. To return the transistor 16 to its conducting state its base drive voltage must again go positive. When transistor 16 again conducts transistor 20 will be back biased and cut off with the load resistance $R_L$ again equalling the resistor 19. In either stable state my circuit has an input impedance at least equal to $\beta$ times the load resistor 19.

Figure 2:
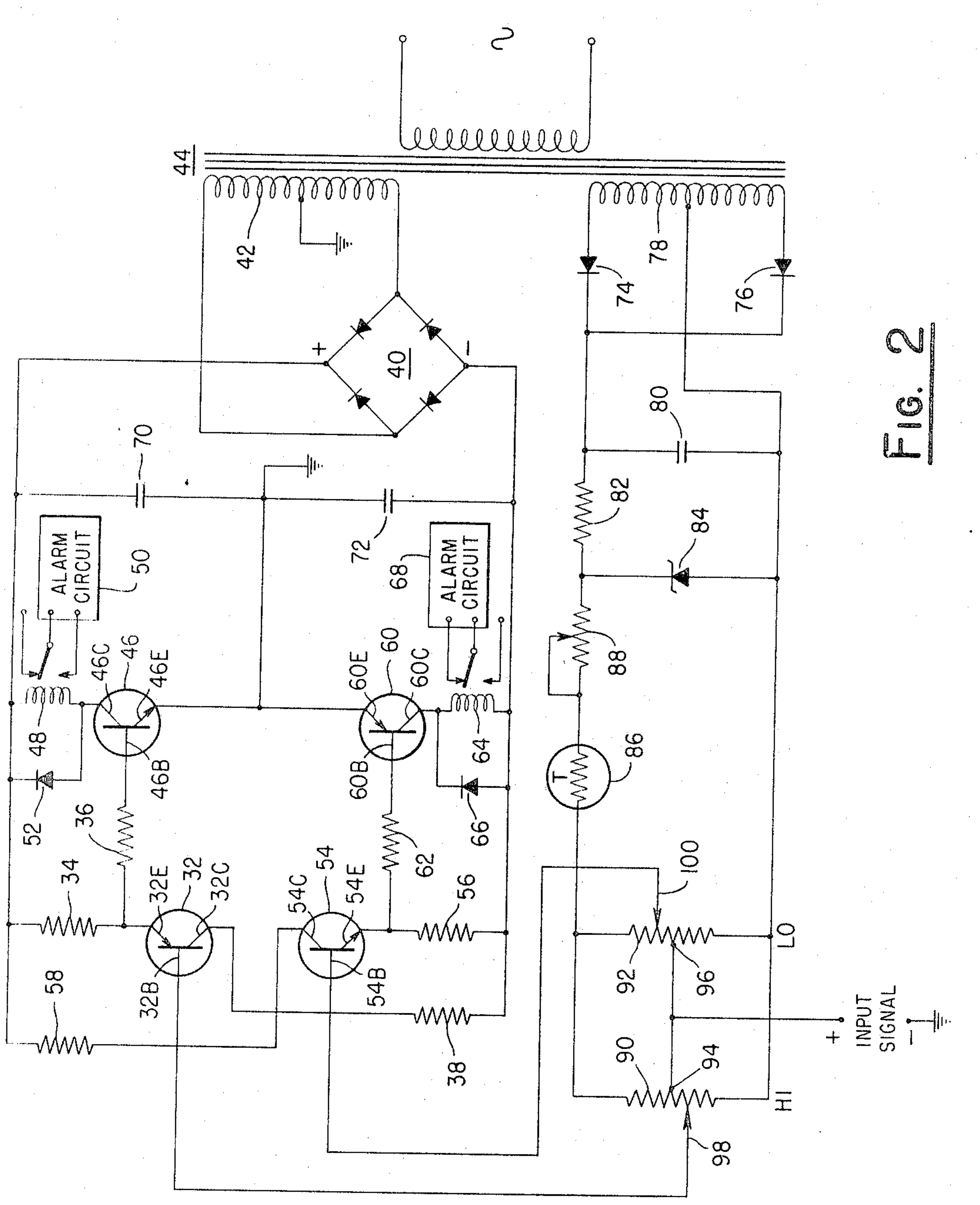
FIG. 2 is a detailed schematic of a high-low alarm monitor employing my high impedance switching circuit.

Referring to FIG. 2, I show a particular use of the switching circuit of FIG. 1. FIG. 2 is a schematic diagram of what is commonly known as a high-low alarm monitor. The base electrode 32B of switching transistor 32, connects to a high-alarm set point circuit, to be described shortly. The emitter electrode 32E connects to a load resistor 34 and a current limiting resistor 36. Connected to the collector electrode 32C is a supply resistor 38 which in turn connects to the negative terminal of a full wave rectifier 40. A supply transformer 44, having a grounded center-tapped secondary winding 42, supplies the rectifier bridge 40 with an alternating voltage. The negative terminal of the full wave bridge 40, in the circuit on which my invention was perfected, is 25 volts negative with respect to ground. Connected to the positive terminal of the full wave bridge 40 is the load resistor 34.

Also connected to the current limiting resistor 36 is the base electrode 46B of switching transistor 46. A load relay 48 connects the collector electrode 46C of transistor 46 and the positive terminal of the full wave bridge 40. When the load relay 48 is energized an alarm circuit 50 is put into operation which can include a series of flashing lights, buzzers or any other well known alarm device. A surge protection diode 52 parallels the load relay 48 to protect transistor 46 from reverse voltage spikes. The emitter electrode 46E is connected to ground thereby completing the high-alarm circuit.

For low-signal alarm, a similar circuit is provided and shown in FIG. 2. Included therein is a switching transistor 54, complementary to transistor 32, having a base, emitter and collector electrode. The base electrode 54B is connected to a low-alarm setpoint circuit. The emitter electrode 54E connects to a load resistor 56 which in turn connects to the negative terminal of the full wave bridge 40. Bias voltage for transistor 54 is provided by connecting a supply resistor 58 to the collector electrode 54C and the positive terminal of the full wave bridge 40.

A switching transistor 60 also having a base emitter and collector electrodes, has its base electrode 60B connected to the emitter electrode 54E through a current limiting resistor 62. Transistor 60 is connected in a circuit similar to that of transistor 46, the emitter electrode 60E is connected to ground. A load relay 64, similar to load relay 48, is connected to the collector electrode 60C. Again a surge protection diode 66 parallels the load relay 64 for voltage surge protection. The negative terminal of the bridge rectifier 40 connects to and supplies bias voltage for transistor 60 through load relay 64. To sound an alarm, when a low alarm condition exists, an alarm circuit 68 is actuated by energizing load relay 64. Two filter capacitors 70 and 72 complete my high-low alarm circuit.

As mentioned previously the base electrodes of transistors 32 and 54 are respectively connected to high and low alarm adjustments. These adjustments consist of potentiometers connected to a regulated direct current supply. The regulated supply includes diodes 74 and 76 connected to rectify an A-C voltage produced by secondary winding 78 of the supply transformer 44. Also included in the regulated supply is a filter capacitor 80, a Zener diode 84 for voltage regulation, a resistor 82 for current limiting, a thermistor 86 for temperature compensation over a wide range of ambient temperatures and a potentiometer 88 for accurate adjustment of the regulated D-C voltage. Two parallel connected center-tapped potentiometers 90 and 92 are used for adjustment of the high and low alarm setpoints. The input signal connected to center-taps 94 and 96 of said potentiometers. Whenever the input signal exceeds the voltage set by positioning the movable contacts 98 and 100 an alarm condition exists.

Operation of the high-low alarm circuit is identical to that described with reference to the circuit of FIG. 1. For example, when the base voltage to transistor 32 is positive with respect to its emitter, transistor 46 will be forward biased and conducting. This cuts off transistor 32 and energizes load relay 48. A high alarm condition exists and the alarm circuit 50 is actuated. When the base voltage of transistor 32 is negative the circuit is in its non-alarm condition. That is, load relay 48 is de-energized, the alarm circuit 50 is disconnected and transistor 46 is cut-off.

Figure 3:
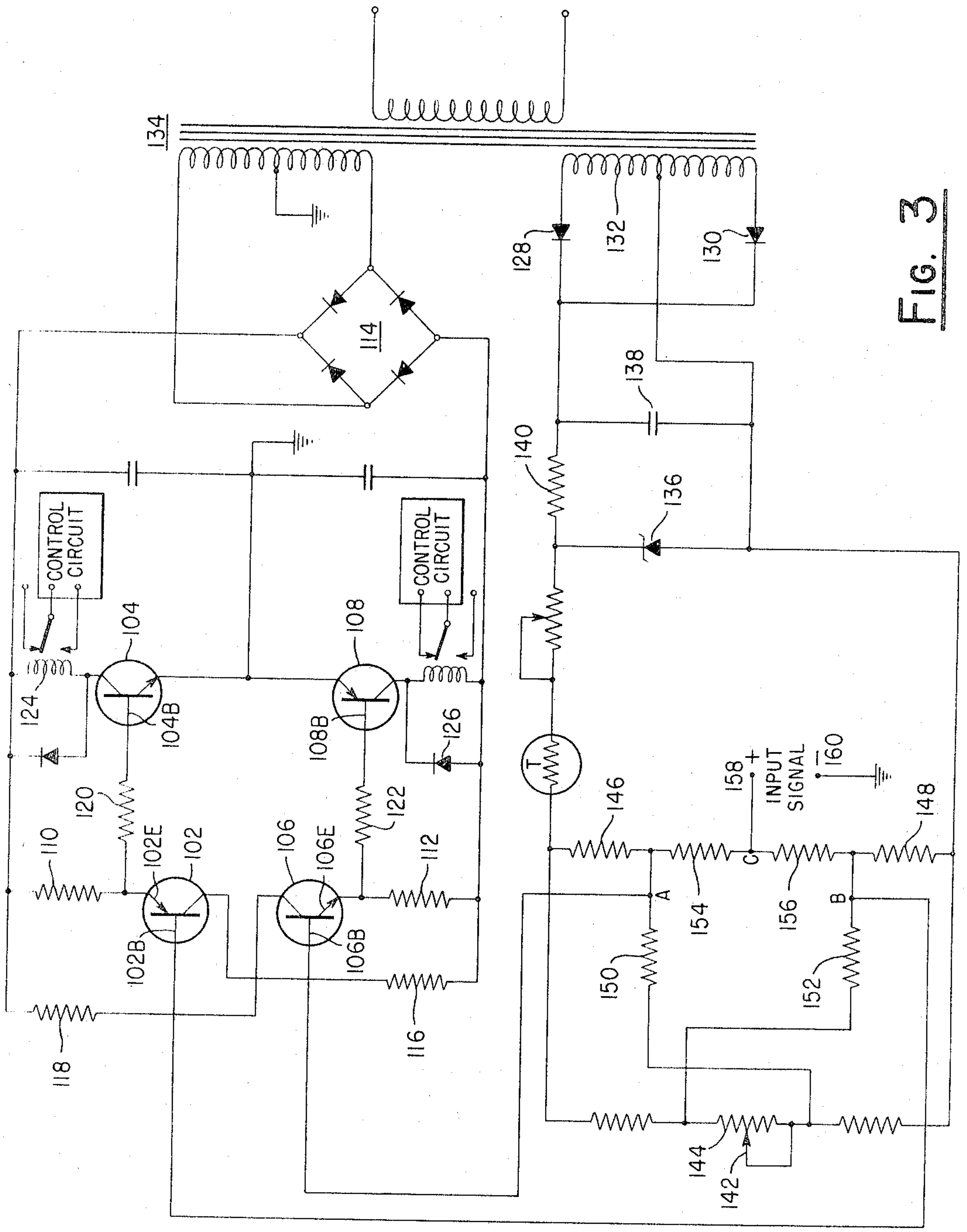
FIG. 3 is a detailed schematic of a three-position controller also employing my switching circuit.

The three position controller, shown in FIG. 3, is very similar to the high-low alarm of FIG. 2. There are four switching transistors 102, 104, 106 and 108 each having base, emitter and collector electrodes. Transistors 102 and 106 have emitter electrodes 102E and 106E respectively connected through load resistors 110 and 112 to the positive and negative terminals of a bridge rectifier 114. Transistors 102 and 106 are supplied D-C bias voltage from the negative and positive terminals of the bridge rectifier 114 through individual supply resistors 116 and 118.

Base electrodes 104B and 108B of transistors 104 and 108 are connected to the emitter electrodes 102E and 106E through current limiting resistors 120 and 112 respectively. Transistor 104 connects to a load relay 124 which is energized by conduction of said transistor. Another load relay 126 is connected to the transistor 108 and energized when said transistor is conducting. Shown in FIG. 3 are simple block diagrams of control systems activated by energizing the respective load relays 124 or 126. It is not believed essential to an understanding of my invention to detail any particular control system.

The three position controller shown in FIG. 3 applies a full positive correcting signal to the system being controlled when the error signal is more positive than a predetermined voltage and applies a full negative corrective signal to the system being controlled when the error signal is more negative than a second predetermined voltage. The difference between the first and second predetermined voltages is known as the controller dead-band. A potentiometer provides a means for adjusting the width of the dead-band as will be explained shortly. The dead-band adjustment potentiometer is part of a circuit which replaces the high-low alarm setpoint adjustment of FIG. 2. A regulated supply, identical to that described in FIG. 2, supplies the necessary D-C voltage. Thus, there is a full wave rectifier consisting of a pair of diodes 128 and 130 connected to the secondary winding 132 of a supply transformer 134, a filter capacitor 138, a current limiting resistor 140 and a Zener diode 136 for regulating the resultant D-C voltage.

The two setpoint potentiometers 90 and 92, in the high-low alarm monitor of FIG. 2, are replaced by the circuit shown connected to the regulated supply of FIG. 3. This network supplies equal voltages of opposite polarity to the base electrodes 102B and 106B. With the wiper arm 142 of the dead-band potentiometer 144 set all the way up (zero resistance in the circuit), the regulated D-C voltage is divided between resistors 146 and 148 and the parallel combination of resistors 150, 152 and resistors 154, 156. The voltage at point A is positive with respect to the voltage at point C while the voltage at point B is negative with respect to C. When the wiper arm 142 is all the way down (full resistance in the circuit) the network is adjusted to make point A slightly negative with respect to point C while point B is slightly positive with respect to C. With all resistance out, position 1, the dead-band is at its maximum setting. When all the resistance is in, position 2, the dead-band is at its minimum adjustment.

The three-position control operates in essentially the same manner as the high-low alarm monitor of FIG. 2. When an input signal at the input terminals 158 and 160 is either greater or less than the set dead-band limits, one of the base drive signals will pass through zero. This causes either transistors 102 and 104 or 106 and 108 to change from one stable state to the other. Whichever set has changed, its associated load relay will be energized. The switching action in all cases being the same as the high-low alarm monitor.

Figure 4:
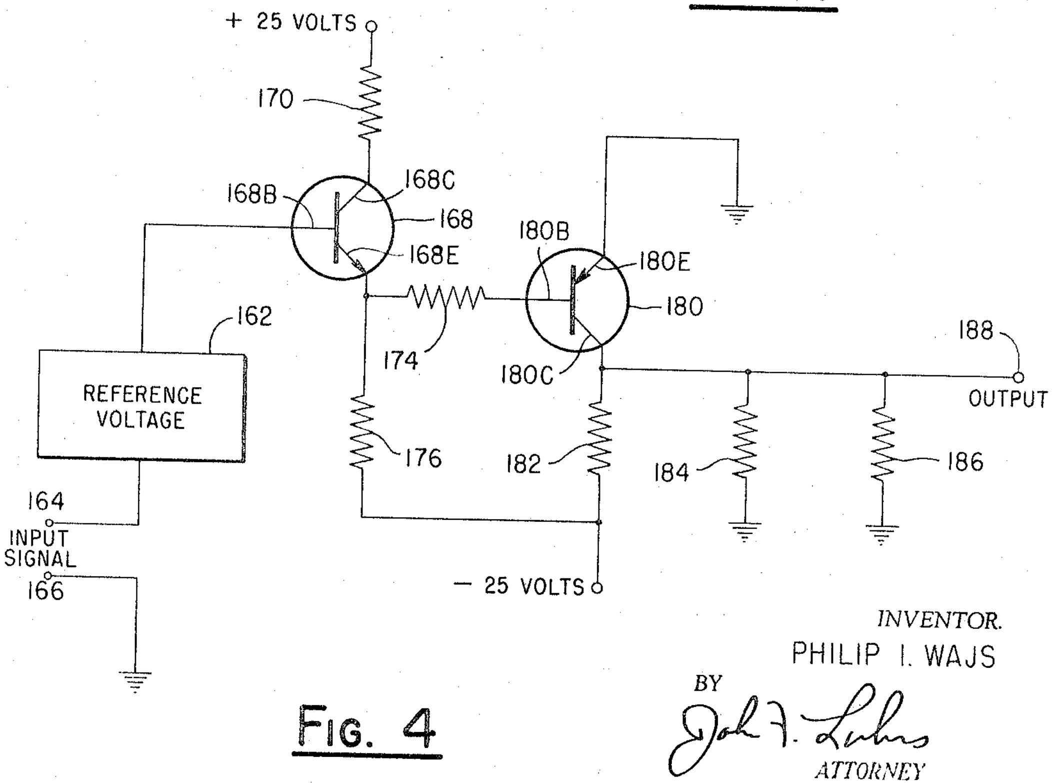
FIG. 4 is a schematic of a simplified null detector circuit.

FIG. 4 is a schematic diagram of a logic circuit employing my invention. I refer to this as my "inexpensive" null detector. Many analog-to-digital converters employ a comparator circuit for comparing an analog reference signal with the input signal being digitized. I show in FIG. 4 a reference voltage 162 for comparison with an analog signal at input terminals 164 and 166. The difference between these signals is the base drive voltage connected to the base electrode 168B of transistor 168. A supply transistor 170 connects the collector electrode 168C to a +25 volt direct current supply, not shown. Connected to the emitter electrode 168E is a current limiting resistor 174 and a load resistor 176. The load resistor 176 also connects to a —25 volt direct current supply, not shown.

A transistor 180, having a base, emitter, and collector electrode, also has its base electrode 180B connected to the current limiting resistor 174. As in previous uses of my invention, the emitter electrode 180E is connected to ground. The collector electrode 180C of transistor 180 connects to the —25 volt direct current supply through a supply resistor 182 and through a parallel combination of load resistors 184 and 186. The logical output signal of my null detector is taken from an output terminal 188 also connected to the collector electrode 180C. The output signal is either a logic 1 or logic 0 depending on whether or not a null condition exists between the two analog input signals.

Since the null detector of FIG. 4 differs very little from the circuit of FIG. 1 its operation is essentially the same. Whenever the reference voltage exceeds the input signal transistor 168 is back biased and non-conducting and transistor 180 is forward biased and conducting. With emitter electrode 180E tied to ground potential the voltage at the output terminal 188 will be zero. This, in popular logic parlance, is referred to as logic 1.

Assume the analog signal connected to the input terminals 164 and 166 is greater than the reference voltage, the transistor 168 is conducting and transistor 180 non-conducting. A current path now exists from the —25 volt direct current supply through the supply resistor 182 and the parallel connected load resistors 184 and 186. By properly sizing the load resistors 184 and 186 the output terminal 188 can be fixed at any desired voltage level greater than —25 volts. In many digital systems a level often used is —10 volts which corresponds to a logic zero.

It will be understood that various changes in the components and arrangements thereof, which have been herein described and illustrated in order to explain the nature of my invention, may be made by those skilled in the art without deviating from the principal and scope of the invention as expressed in the appended claims.

What I claim as new and desire to secure by Letters Patent of the United States is:

1. A high-low alarm monitor having a high input impedance in the alarm and non-alarm condition, comprising, a first transistor having base, emitter and collector electrodes;

a first resistance connected to the emitter electrode of said first transistor;

a second resistance also connected to the emitter electrode of said first transistor;

a second transistor having base, emitter and collector electrodes, said emitter electrode connected to ground, said base electrode connected to said second resistance;

a third transistor having base, emitter and collector electrodes;

a third resistance connected to the emitter electrode of said third transistor;

a fourth resistance also connected to the emitter electrode of said third transistor;

a fourth transistor having base, emitter and collector electrodes, said emitter electrode connected to ground, said base electrode connected to the fourth resistance;

first biasing means connected to said first resistance and the collector electrode of said second transistor for biasing said first transistor conducting and said second transistor non-conducting when said monitor is in a non-alarm condition;

second biasing means connected to said third resistance and the collector electrode of said fourth transistor for biasing said third transistor conducting and said fourth transistor non-conducting when said monitor is in a non-alarm condition;

means for applying a high-alarm signal to the base electrode of said first transistor to change said transistor to its non-conduction state and said second transistor to its conducting state and the monitor from a non-alarm to an alarm condition;

and means for applying a low-alarm signal to the base electrode of said third transistor to change said transistor to its non-conducting state and said fourth transistor to its conducting state and the monitor from a non-alarm to an alarm condition.

2. A high-low alarm monitor as set forth in claim 1, including an alarm circuit connected between said first biasing means and the collector electrode of said second transistor, said alarm circuit being energized when said monitor is in a high-alarm condition.

3. A high-low alarm monitor as set forth in claim 2, including an alarm circuit connected between said second biasing means and the collector electrode of said fourth transistor, said alarm circuit being energized when said monitor is in a low-alarm condition.

4. A high-low alarm monitor as set forth in claim 1 wherein said means for applying a high-alarm signal to said first transistor includes a regulated source of D-C voltage and a center-tapped potentiometer connected to said regulated source of D-C voltage, said potentiometer providing a means for adjusting the signal level required to produce a high-alarm condition.

5. A high-low alarm monitor as set forth in claim 4 wherein said means for applying a low-alarm signal to said third transistor includes a regulated source of D.C. voltage and a center-tapped potentiometer connected to said regulated source of D.C. voltage, said potentiometer providing a means for adjusting the signal level required to produce a low-alarm condition.

6. A three-position controller having a full negative control position, a full positive control position, and a dead-band position comprising:

a first transistor having base, emitter and collector electrodes;

a first resistance connected to the emitter electrode of said first transistor;

a second resistance also connected to the emitter electrode of said first transistor;

a second transistor having base, emitter and collector electrodes, said base electrode connected to said second resistance;

first rectified direct voltage means for biasing said first transistor in a conducting state when said controller is in its dead-band position;

an electric relay having a normally open contact, said relay connected between said biasing means and the collector electrode of said second transistor;

a third transistor having base, emitter and collector electrodes;

a third resistance connected to the emitter electrode of said third transistor;

a fourth resistance also connected to the emitter electrode of said third resistor;

a fourth transistor having base, emitter and collector electrodes, said base electrode connected to the fourth resistance;

second rectified direct voltage means for biasing said third transistor in a conducting state and said fourth transistor in a non-conducting state when said controller is in its dead-band position;

a second electric relay having a normally open contact, said relay connected between said second biasing means and the collector electrode of said fourth transistor;

first input voltage divider means for applying a signal to the base electrode of said first transistor to change said transistor to its non-conducting state and said second transistor to its conducting state, conduction of said second transisor energizing said first relay thereby transferring the controller to its full positive control position;

second input voltage divider means for applying a signal to the base electrode of said third transistor to change said transistor to its non-conducting state and said fourth transistor to its conducting state, conduction of said fourth transistor energizes said second relay thereby transferring the controller to its full negative position.

7. A three position controller as set forth in claim 6 wherein said signal applying means includes a regulated D.C. voltage source and a potentiometer connected to said regulated D.C. source for adjusting the signal level required to change the controller from its dead-band position to either its full negative or full positive control position.

8. A three position controller as set forth in claim 7 wherein said potentiometer is connected in series with two resistors, said series combination connected in parallel with four serially connected resistors.

9. A high impedance null detector, comprising, a first transistor having base, emitter and collector electrodes;

a second transistor having base, emitter and collector electrodes;

a first resistance connected to the emitter electrode of said first transistor and the base electrode of said second transistor;

a negative DC voltage source;

a second resistance connected to the emitter electrode of said first transistor and said DC source for biasing said first transistor in a conducting state;

a third resistance connected to the collector electrode of said second transistor and said DC source for biasing said second transistor in a non-conducting state;

means connected to the collector electrode of said second transistor for producing an output voltage when a null condition exists;

means for connecting an analog input signal to the base electrode of said first transistor;

and a reference voltage source in series with said input signal and said base electrode for generating and increasing analog signal, said first transistor changing from a conducting to a non-conducting condition when said reference voltage equals said input signal thereby producing a null condition.

10. A null detector as set forth in claim 9 wherein said output voltage producing means includes two resistors connected in parallel to ground.

11. A null detector as set forth in claim 10 wherein said DC voltage source supplies −25 volts.

12. A null detector as set forth in claim 11 wherein said parallel output resistors produce −10 volts at the collector electrode of said second transistor when a null condition exists.

References Cited

UNITED STATES PATENTS

| | | | |
|---|---|---|---|
| 2,954,479 | 9/1960 | Cibelius. | |
| 3,015,784 | 1/1962 | Cirone | 307—88.5 |
| 3,018,420 | 1/1962 | Norris | 317—148.5 |
| 3,030,525 | 4/1962 | Cobbold | 307—88.5 |
| 3,176,284 | 3/1965 | Jones et al. | 317—148.5 X |
| 3,225,266 | 12/1965 | Bando | 317—148.5 X |

MILTON O. HIRSHFIELD, *Primary Examiner.*

L. T. HIX, *Assistant Examiner.*